(12) United States Patent
Lu et al.

(10) Patent No.: US 7,277,806 B2
(45) Date of Patent: Oct. 2, 2007

(54) METHOD FOR REMOVING AIR WAVE EFFECT FROM OFFSHORE FREQUENCY DOMAIN CONTROLLED-SOURCE ELECTROMAGNETIC DATA

(75) Inventors: Xinyou Lu, Missouri City, TX (US); Leonard J. Srnka, Bellaire, TX (US); James J. Carazzone, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 183 days.

(21) Appl. No.: 10/557,121

(22) PCT Filed: Feb. 20, 2004

(86) PCT No.: PCT/US2004/005024

§ 371 (c)(1), (2), (4) Date: Nov. 17, 2005

(87) PCT Pub. No.: WO2005/010560

PCT Pub. Date: Feb. 3, 2005

(65) Prior Publication Data

US 2007/0061078 A1    Mar. 15, 2007

Related U.S. Application Data

(60) Provisional application No. 60/482,681, filed on Jun. 26, 2003.

(51) Int. Cl.
*G01V 3/08* (2006.01)
*G06F 19/00* (2006.01)

(52) U.S. Cl. ......................................................... 702/76

(58) Field of Classification Search ................... 702/76
See application file for complete search history.

(56) References Cited

U.S. PATENT DOCUMENTS

| 4,792,761 | A | 12/1988 | King et al. | |
|---|---|---|---|---|
| 6,512,356 | B1 * | 1/2003 | Webb | ............................ 324/72 |
| 6,603,313 | B1 | 8/2003 | Srnka | |
| 6,765,383 | B1 | 7/2004 | Barringer | |
| 6,842,006 | B2 * | 1/2005 | Conti et al. | .................. 324/350 |
| 2004/0108854 | A1 * | 6/2004 | Nichols | ....................... 324/348 |

FOREIGN PATENT DOCUMENTS

| WO | WO 03/100467 | 4/2003 |
|---|---|---|
| WO | WO 2004/008183 | 1/2004 |

OTHER PUBLICATIONS

Chave et al. "Controlled Electromagnetic Sources for Measuring Electrical Conductivity Beneath the Oceans", 1982, Journal of Geophysical Research, vol. 87, No. B7, pp. 5327-5338.*
Kong, J. A. (1990) *Electromagnetic Wave Theory*, 2nd Ed., pp. 312-321, John Wiley & Sons, Inc.
Chave, A. D. and C.S. Cox (1982) "Controlled Electromagnetic Sources for Measuring Electrical Conductivity Beneath the Oceans 1. Forward Problem and Model Study" *J. Geophys. Res.*, 87, No. B7, pp. 5327-5338.

(Continued)

*Primary Examiner*—John Barlow
*Assistant Examiner*—Cindy D. Khuu

(57) ABSTRACT

A method for removing the air wave effect from offshore frequency domain controlled source electromagnetic survey data. The region of interest is modeled with (111) and without (113) a top air layer. The electromagnetic field due to the source is computed at the survey receiver positions for each source position for both models. The difference between the fields computed (116) from the two models is the air wave effect, which is then subtracted (117) from the field data for the corresponding source-receiver geometry.

5 Claims, 12 Drawing Sheets

OTHER PUBLICATIONS

Chave, A. D., et al.(1988) "Electromagnetic Methods in Applied Geophysics Part B", *Society of Exploration Geophysicists*, Chapt. 12., pp. 931-966.

Coggon, J. H. and H.F. Morrison (1970) "Electromagnetic Investigation of the Sea Floor", *Geophysics*, 35, No. 3, pp. 476-489, 14 figs.

Constable S. and C.S. Cox, J. (1996) "Marine Controlled-Source Electromagnetic Sounding 2. The PEGASUS Experiment", *J. Geophs. Res.* 101, No. B3, pp. 5519-5530.

Hohmann, G. W. (1988) "Numerical Modeling for Electromagnetic Methods of Geophysics". *Electromagnetic Methods in Applied Geophysics Theory,*, 1, *Society of Exploration Geophysicists*, pp. 313-363.

MacGregor, L. et al. (2001) "Electrical Resistivity Structure of the Valu Fa Ridge, Lau Basin, From Marine Controlled-Source Electromagnetic Sounding", *Geophy. J. Int.*, 146, pp. 217-236.

Ellingsrud, S. et al. (2002) "Remote Sensing of Hydrocarbon Layers by Seabed Loffing (SBL): Results from a Cruise Offshore Angola", *The Leading Edge*, pp. 972-982.

Eidesmo, T. et al. (2002) "Sea Bed Logging (SBL), a New Method for Remote and Direct Identification of Hydrocarbon Filled Layers in Deepwater Areas", *First Break* 20.3, pp. 144-152.

Stratton, J. A. (1941) *Electromagnetic Theory*, pp. 504, MacGraw-Hill.

* cited by examiner

METHOD FOR REMOVING AIR WAVE EFFECT FROM OFFSHORE FREQUENCY DOMAIN CONTROLLED-SOURCE ELECTROMAGNETIC DATA

This application is the National Stage of International Application No. PCT/US2004/005024, filed Feb. 20, 2004, which claims the benefit of U.S. Provisional Patent Application No. 60/482,681, filed Jun. 26, 2003.

FIELD OF THE INVENTION

This invention relates to the field of geophysical prospecting and, more particularly, to controlled-source electromagnetic survey for hydrocarbons. Specifically, the invention is a method for removing the air wave effect encountered in such data when the data are obtained in the frequency domain.

BACKGROUND OF THE INVENTION

Offshore controlled-source electromagnetic (CSEM) geophysical surveys use man-made electric and magnetic sources to generate electromagnetic fields to excite the earth and deploy instruments/receivers in the ocean, on the seafloor and inside boreholes to measure electric and magnetic fields. FIG. 1 is a schematic diagram of such a survey, with electromagnetic source 11 connected by cable to a vessel and receivers 12 located in the ocean, and often on the seafloor 13. The measured fields are analyzed to investigate the sub-sea floor structures of the earth's interior. This technology has been applied not only in oceanic tectonic studies but also in offshore hydrocarbon and mineral exploration (A. D. Chave et al., in *Electromagnetic Methods in Applied Geophysics* 2, 931-966 Society of Exploration Geophysicists (1988); S. Constable and C. S. Cox, *J. Geophs. Res.* 101, 5519-5530 (1996); L. MacGregor et al., *Geophy. J. Int.*, 146, 217-236 (2001); S. Ellingsrud et al., *The Leading Edge*, 972-982 (2002); T. Eidesmo et al., *First Break* 20.3, 144-152 (2002)).

The electromagnetic signals recorded by receivers consist of electromagnetic fields 21, 22 and 23 that travel through the earth 33, seawater 32, and air 31, respectively, as illustrated in FIG. 2. The signal 23 that travels partly through air is called an "air wave." Offshore controlled-source electromagnetic geophysical surveys are normally operated at frequencies below 1.0 KHz. It is well known that, in this quasi-static frequency regime, penetration of electromagnetic waves into a medium varies inversely with both the frequency of the wave and the conductivity of the medium. This result follows from the theory of skin effect phenomena (J. A. Stratton, *Electromagnetic Theory*, page 504, MacGraw-Hill (1941)). Since the seawater is much more conductive than both air and the earth, electromagnetic signals through the seawater decay much faster than through the air and the earth. So, for source and receiver offsets longer than approximately twice the seawater depth, the recorded electromagnetic fields mainly come from through the air and the earth. However, only the signals traveling through the earth provide information of the sub-sea floor structures of the earth's interior. For deep sub-sea floor targets 34, electromagnetic is fields need to be generated at low frequencies to ensure that the transmitted electromagnetic signals 25 penetrate to the target depth. Unfortunately, for "shallow" water depth relative to the target depth and at low frequencies, the air wave signal may be dominant at receivers 12 with long offsets to the source 11 so that the target signal is hardly distinguishable. Obviously, conditions are best for CSEM prospecting when signal 25 dominates the combined effects of signals 21, 22 and 23.

Air wave interference is a problem when measurements are made in the frequency domain, i.e., when the source continues to transmit its signals while data are being collected at the receivers. The simplest source signal is a sinusoidal signal with a selected frequency. For operational efficiency, multiple frequencies can be transmitted at the same time in the form of a complex waveform, such as a square wave. A complement to the frequency domain CSEM is the time domain CSEM. In time domain CSEM, the source is turned on and then turned off after a desired wave form is transmitted (for example, a pulse, a boxcar, or a step function). The air wave may not be a problem in time domain CSEM because the air wave will be recorded at an earlier time, separated from target signals. However, advantages offered by frequency domain CSEM in more sophisticated modeling and inversion software, better understood results, and higher-quality data make frequency domain CSEM used more widely in geophysical surveys than time domain CSEM. As persons skilled in the art will understand, notwithstanding the preceding observations, all CSEM data are actually obtained in the time domain, i.e., they are collected by a recording device as a more or less continuous stream of numbers, with the independent variable being time. What distinguish frequency domain CSEM are the way the experiment is conducted (continuous source) and the methods used to analyze and interpret the data whereby the data are decomposed into individual frequency components, e.g., Fourier analysis.

The air wave effect can be easily illustrated using a simple one-dimensional (1D) layered model. As shown in FIG. 3, from top to bottom, the model consists of five layers: non-conductive air 31, seawater 32 (conductivity=3.0 Siemens/m, depth to be varied in examples below), mud rocks 33 (1.0 Siemen/m, 1.0 km thick), resistive reservoir layer 34 (0.01 Siemen/m, 100.0 m thick), and basement 35 (1.0 Siemen/m). If the resistive layer 34 is the target and is removed from this model, a new model results and may be defined as the background model of the original model. A unit horizontal electric dipole source 11 directed in the x-axis (HEDX) is towed in the direction of the x-axis and 50 m above the seafloor. A seafloor receiver 12 is located right below the mid point of the source tow line (not shown in FIG. 3).

FIGS. 4A-4C are graphs of the amplitude of the x-component of electric fields ($E_x$) vs. source-receiver separation in the x-direction for both this 1D model and its background model. The seawater depth is 5.0 km in FIG. 4A, 1.0 km in FIG. 4B, and 100 m in FIG. 4C. FIGS. 4D-4F show the corresponding "unwrapped" phase, for the same three seawater depths. Unwrapped phase is obtained by changing absolute jumps greater than $\pi$ to their $2\pi$ complement. The curves of small circles represent data from the 1D model and the solid lines are from the background model. For the seawater depth of 5 km (FIGS. 4A and 4D), there is negligible air wave effect on data from both models for all source and receiver separations plotted in the figure.

Large separation between the 1D model's curves 41 and 43 and its background curves 42 and 44 indicates that the signal from the resistive layer buried 1.0 km below the seafloor is significant when the source-receiver separation is larger than ~2 or 3 km. (The lack of separation between the model and background curves for small source-receiver spacing is due to the correspondingly low attenuation of the water path 22 and the seafloor path 21. Contribution from those two signals dominates the received signal for receivers with small offset (source-receiver separation), even with the target layer in the model.) When the seawater depth is decreased to 1.0 km (FIGS. 4B and 4E), the separation between these two curves shrinks significantly because of the air wave effect, i.e., the path 23 in FIG. 2 now travels through is much less water and consequently attenuation of the unwanted air wave is greatly diminished. This effect is magnified with increasing offset. At offsets longer than ~6 or 7 km, the air wave effect dominates the received signal for the background model. This can be seen from the background curves 46 and 48 in FIGS. 4B and 4E, in particular the break in slope of the amplitude curve 46 around 6 km and the constant phase of the phase curve 48 beyond ~7 km. However, no such features appear in the data curves 45 and 47 for the 1D model with the buried resistive layer because the signal from the buried resistive layer is still stronger than the air wave effect for this 1D model with 1.0 km water depth. This no longer holds when the seawater depth is 100 m, for which FIG. 4C shows that model data with and without the resistive reservoir layer are hardly distinguishable in amplitude for all offsets. (The significant departure between the two phase curves of FIG. 4F for offsets greater than ~3 km is primarily an effect of the infinitely extended 1D model used rather than being due to signal from the target; FIG. 9B shows this effect essentially eliminated with a more realistic model.) Matters would be even worse for field data with noise. This implies that the air wave effect dominates the received signal even though the signal from the subseafloor target is strong. The results from this example clearly demonstrate the problem of the air wave effect.

Air wave contribution was investigated by Chave and Cox in their theoretical numerical model study for offshore CESM exploration with an horizontal electric dipole source (A. D. Chave and C. S. Cox, *J. Geophys. Res.* 87, 5327-5338 (1982)). Chave and Cox realized that the effect of seawater depth would be important at large source-receiver separations, low frequencies, or in relatively shallow water. They pointed out that the effect can be incorporated into the theory if both water depth and source location are accurately determined, but they did not disclose any method to compute the effect or remove it from CSEM data.

Eidesmo, et al., in the First Break article cited previously, not only described the features of the effect of the air wave on the amplitude and phase but also observed that the range at which the air wave dominates the is response, and information on seabed resistivity is lost, increases with decreasing frequency and water depth. The effect of the air wave can therefore be minimized by choosing appropriate transmission frequencies, and by targeting surveys on prospects in deep water and in which the target is at a relatively shallow depth below the seabed. However, the tactics of working outside of the air wave dominant range by carefully choosing transmission frequency and survey prospects cannot be used for prospects where the air wave effect is unavoidable for frequencies which can excite targets to generate recordable signals.

In a theoretical study of electromagnetic investigation of the sea floor using a vertical magnetic dipole (VMD), Coggon and Morrison concluded that, with a poorly conducting seabed, the total horizontal magnetic fields result from energy propagating in two main ways: through the bottom (the seabed) and through the air just above the sea surface. They also computed the air contribution and compared it with the actual effect of the sea/air interface alone to demonstrate that total out-of-phase magnetic field response is approximately the simple sum of air and bottom path contributions (J. H. Coggon and H. F. Morrison, *Geophysics* 35, 476-489 (1970)). However, this air wave contribution computation is performed primarily to verify the concept of two main energy propagating pathways, not to enhance the target signal by removing the air wave effect from the measured data as the invention does. The authors' conclusion about what use to make of their research is summed up in the quotation, "in practice it may often be desirable to operate with D/R above this minimum so that variations in sea depth can be neglected." D is water depth and R is source-receiver separation. Thus, like Eidesmo et al., Coggon and Morrison teach to avoid conditions such as shallow water depth or large source-receiver separations that tend to make air waves a serious noise source in CSEM data.

Accordingly, there is a need for a reliable method for removing the air wave effect from frequency domain CSEM data in applications where such noise is unavoidable. The present invention satisfies this need.

SUMMARY OF THE INVENTION

In one embodiment, the present invention is a method for removing the air wave effect from offshore frequency domain controlled source electromagnetic survey data, which comprises the steps of (a) constructing a model of the region having a top air layer, a middle sea water layer, and a bottom earth layer, with the model reflecting known bathymetry of the region and known conductivities of the air, seawater and earth; (b) using the model to compute the electromagnetic field at all receiver locations for each source location; (c) replacing the air layer in the model with more sea water to create a no-air model; (d) computing the fields for the same source-receiver geometries for the no-air model; (e) normalizing receiver and source parameters between the two computed responses and the survey data; (f) computing the air wave effect by subtracting the no-air field from the corresponding field from the model with air; and (g) correcting the field data by subtracting the computed air wave effect at each receiver location for each source location.

BRIEF DESCRIPTION OF THE DRAWINGS

The present invention and its advantages will be better understood by referring to the following detailed description and the attached drawings in which.

The invention will be described in connection with its preferred embodiments. However, to the extent that the following detailed description is specific to a particular embodiment or a particular use of the invention, this is intended to be illustrative only, and is not to be construed as limiting the is scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

The present invention is a method for removing the air wave effect from offshore frequency domain CSEM data. It requires the following input information to be measured, calculated or otherwise known or estimated:

a. computation of the electromagnetic fields for a given model and each prescribed source and receiver geometry;

b. measurement of the bathymetry of the survey area;

c. measurement of the seawater conductivity profile of the survey area;

d. measurement of (or otherwise obtaining) the seafloor conductivity of the survey area;

e. measurement of the amplitude and phase of electrical current emitted by one or more sources, at each prescribed position;

f. measurement of the electromagnetic signals at one or more multicomponent receivers that are located at fixed prescribed positions;

g. measurement of the position of the electromagnetic receivers at each of the prescribed positions; and h. measurement of the position of sources (the ends or/and current wireline) at each of the prescribed positions.

In preferred embodiments of the present invention, source and receiver positions and orientations are measured using such techniques as super-short baseline (SSBL) acoustic methods, global positioning system (GPS), magnetic compass, inertial navigation, among other techniques known in the positioning and navigation art.

Figure 5B:
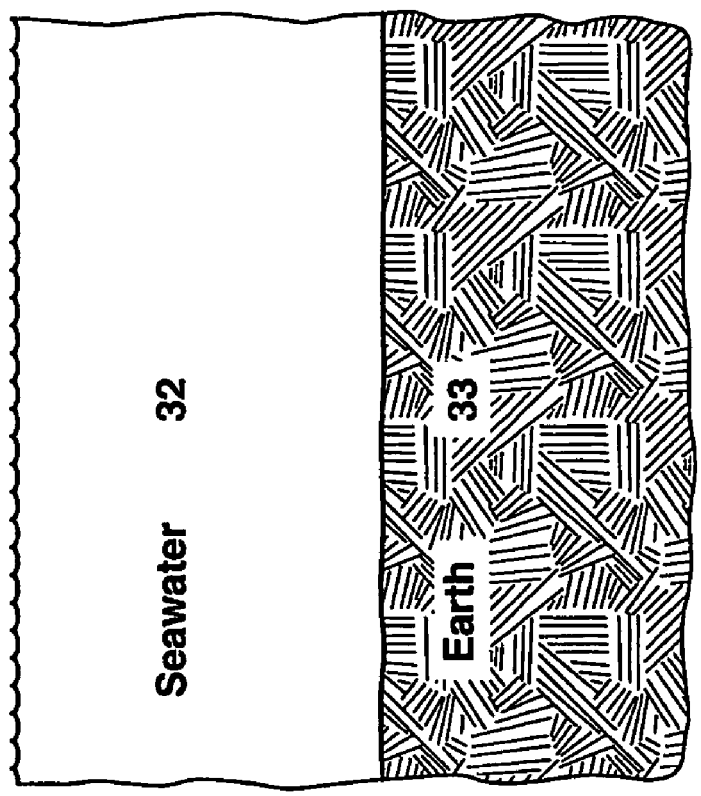
FIGS. 5A and 5B illustrate background models with and without an upper layer of air.
Figure 5A:
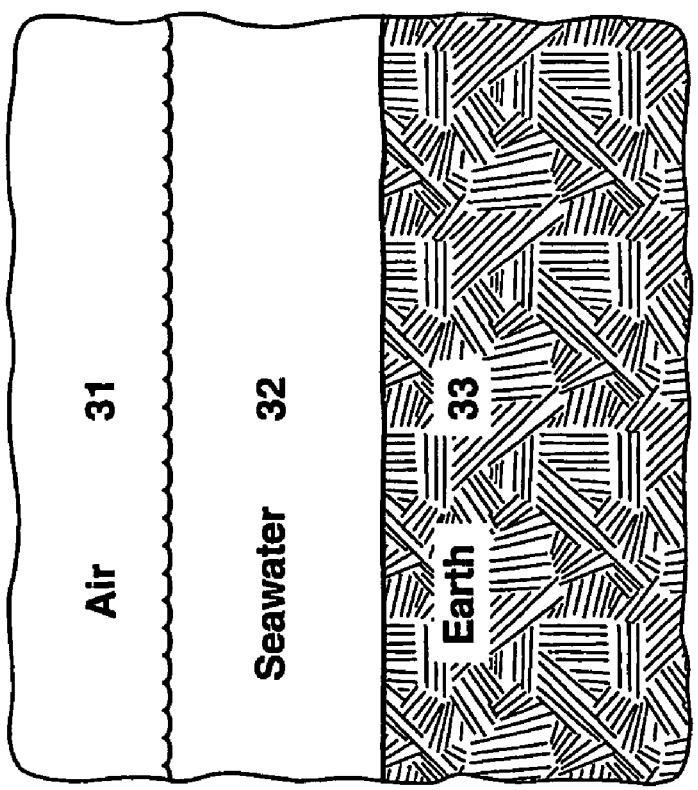
Figure 11:
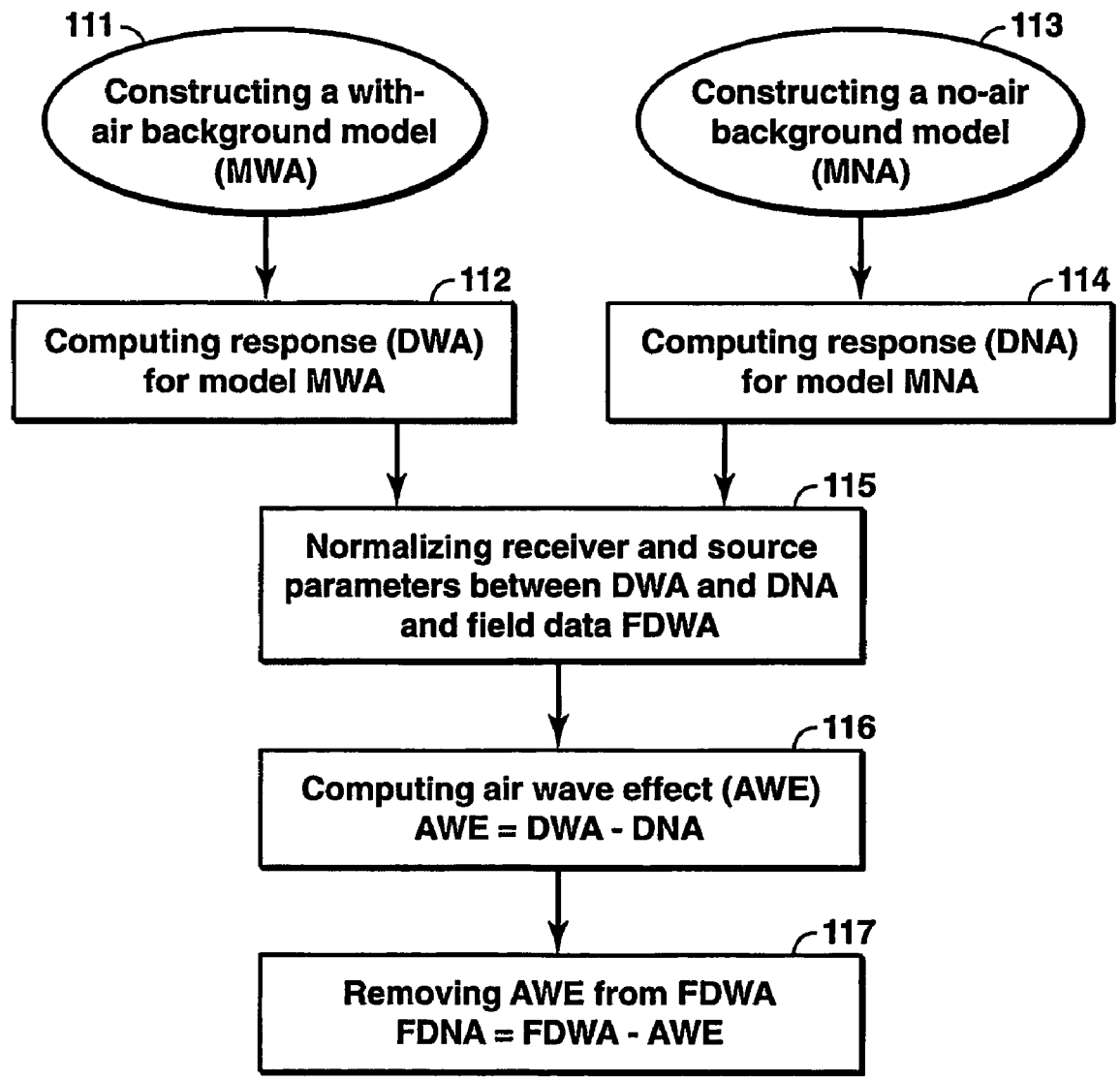
FIG. 11 is a flow chart showing the main steps in the present inventive method.

For field data with the air wave effect (FDWA), the basic steps of the present inventive method are as follows (the reference numbers refer to the flow chart of FIG. 11): 111 constructing a with-air background model (MWA) with the same bathymetry, seawater conductivity, and seafloor conductivity as the survey area (FIG. 5A); 112 computing the electromagnetic response (DWA) for the with-air background model at each receiver and source location, whose geometry is the same as that of the survey; 113 constructing a no-air background model (MNA) by substituting the air on the top of the with-air background model (MWA) with seawater with the conductivity of the surface seawater layer (FIG. 5B); 114 computing the electromagnetic response (DNA) for the no-air background model at each receiver and source location, whose geometry is the same as that of the survey; 115 normalizing (if necessary) the receiver and source parameters (such as antenna length and source power) between the two computed responses and the field data; 116 computing the air wave effect (AWE) by subtracting the response of the no-air background model from the response of the with-air background model, AWE=DWA−DNA; and 117 correcting by subtracting the air wave effect from the field data for each corresponding source and receiver geometry, FDNA=FDWA−AWE. The resulting data will be the corrected data with the air wave effect removed.

A person skilled in the art will recognize that steps 112 and 114 involve solving Maxwell's equations for the specific source and receiver locations and the given model parameters, and with the continuous source waveform used to collect the data in the frequency domain mode of operation. Closed-form analytical solutions are available for a one-dimensional model excited by dipole sources. (J. A. Kong, *Electromagnetic Wave Theory*, $2^{nd}$ Ed., 312-321, John Wiley & Sons, Inc. (1990)) Analytic solutions do not exist for a two-dimensional or three-dimensional model except for certain simple geometries such as spheres and cylinders, where conductivity boundaries correspond to a constant-coordinate surface. Therefore, numerical methods are employed for multi-dimensional models. (G. W. Hohmann, in *Electromagnetic Methods in Applied Geophysics* 1, 313-363, Society of Exploration Geophysicists (1988)).

The CSEM source may, without limitation, be of one of the following types, or combinations thereof: (1) an horizontal electric dipole; (2) a vertical electric dipole; (3) an horizontal magnetic dipole; and (4) a vertical magnetic dipole. Persons skilled in the art will understand that the term dipole is not used here in the strictest sense in which it refers to an infinitesimal source. The source can be towed at any depth or be stationary in the water or on the seafloor. Stationary sources give more accurate measurements, but result in low efficiency in acquiring data. Typically, the source is towed 20-80 m above the seafloor, at a speed of 1-4 knots. Such slower speeds are favored for better source position and negligible distortion of source waveform due to source movement, e.g., the Doppler effect. As in the case of the source, the receivers may be towed, stationary on the seafloor, or inside boreholes. Stationary receivers will have low motion noise and more accurate position.

The accuracy of the results from the present invention will depend on how well the background models (MWA and MNA) represent the actual electric conductivity structures below the seafloor in the survey region. The conductivities below the seafloor can be obtained by known methods including (a) well logs; (b) magnetotelluric measurement; or (c) inversion results from the collected CSEM data.

In the above-described manner, the present invention effectively removes the air wave effect and enhances the target signal. The invention was tested with synthetic data. Following are results from two test models.

EXAMPLES

All of the following examples assume a unit-strength transmitter generating radiation at a frequency of 0.25 Hertz. This value is chosen for illustrative purposes only and, as those skilled in the art will understand, in no way limits the present invention.

Figure 6A:
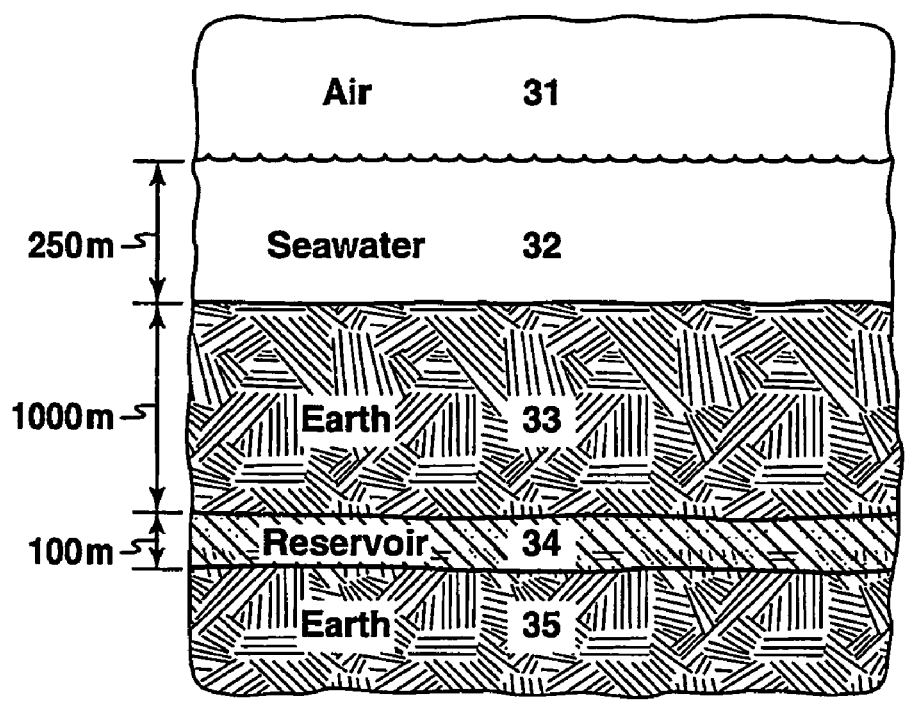
FIGS. 6A-C illustrate models used in a one-dimensional example application, with 6A showing the full model, 6B showing the target (reservoir) layer removed (the "with-air background" model), and 6C showing both target and air layers removed (the "no-air background" model)

The 1-D model shown in FIG. 6A was used to generate a data set used as field data which have the air wave effect. (The reference numbers in FIGS. 5A-5B and 6A-6C are as defined for FIG. 3.) Those data (FDWA) are graphed in FIGS. 7A (amplitude vs. offset) and 7B (phase vs. offset).

Figure 1:
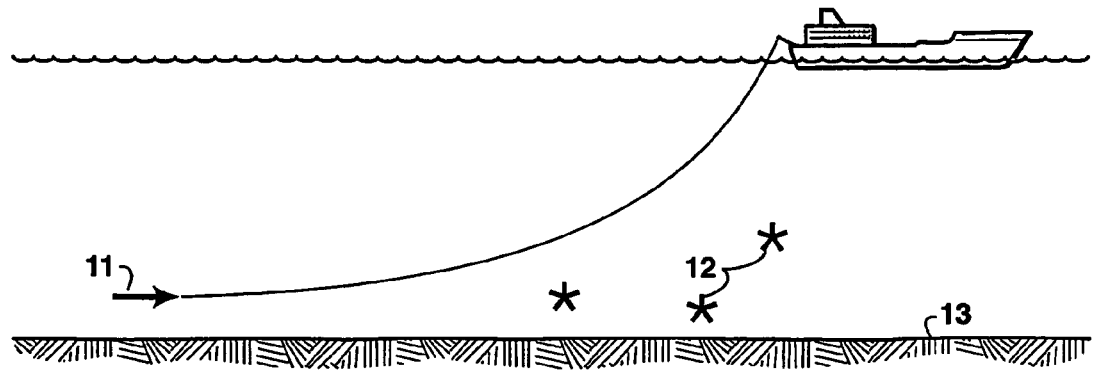
FIG. 1 is a schematic drawing of a CSEM survey.
Figure 2:
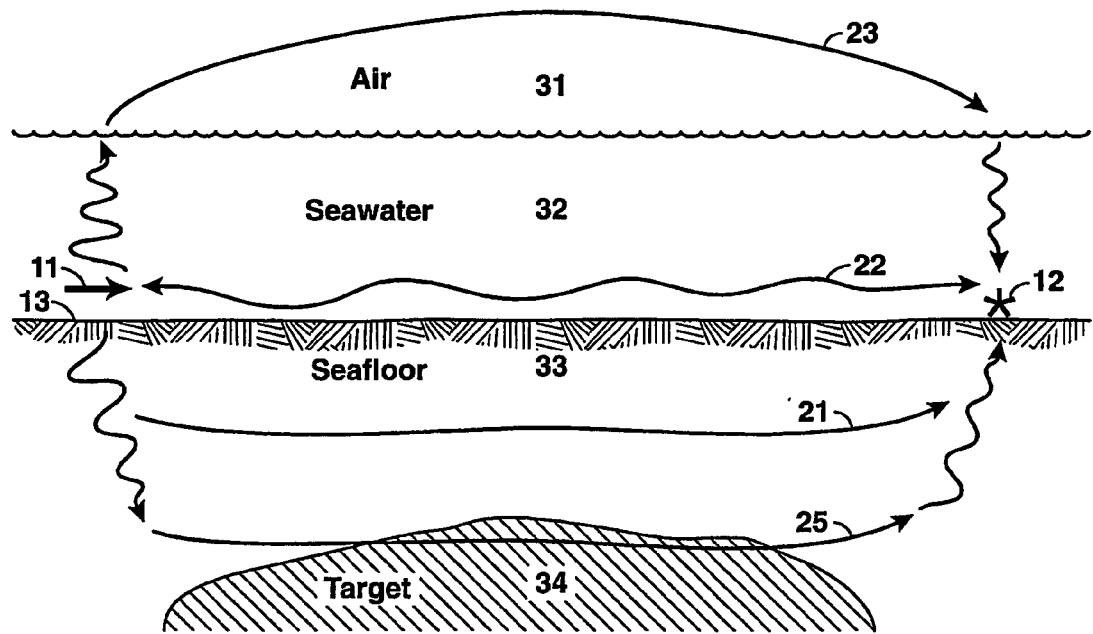
FIG. 2 is a schematic diagram of electromagnetic signal pathways for a CSEM survey.
Figure 3:
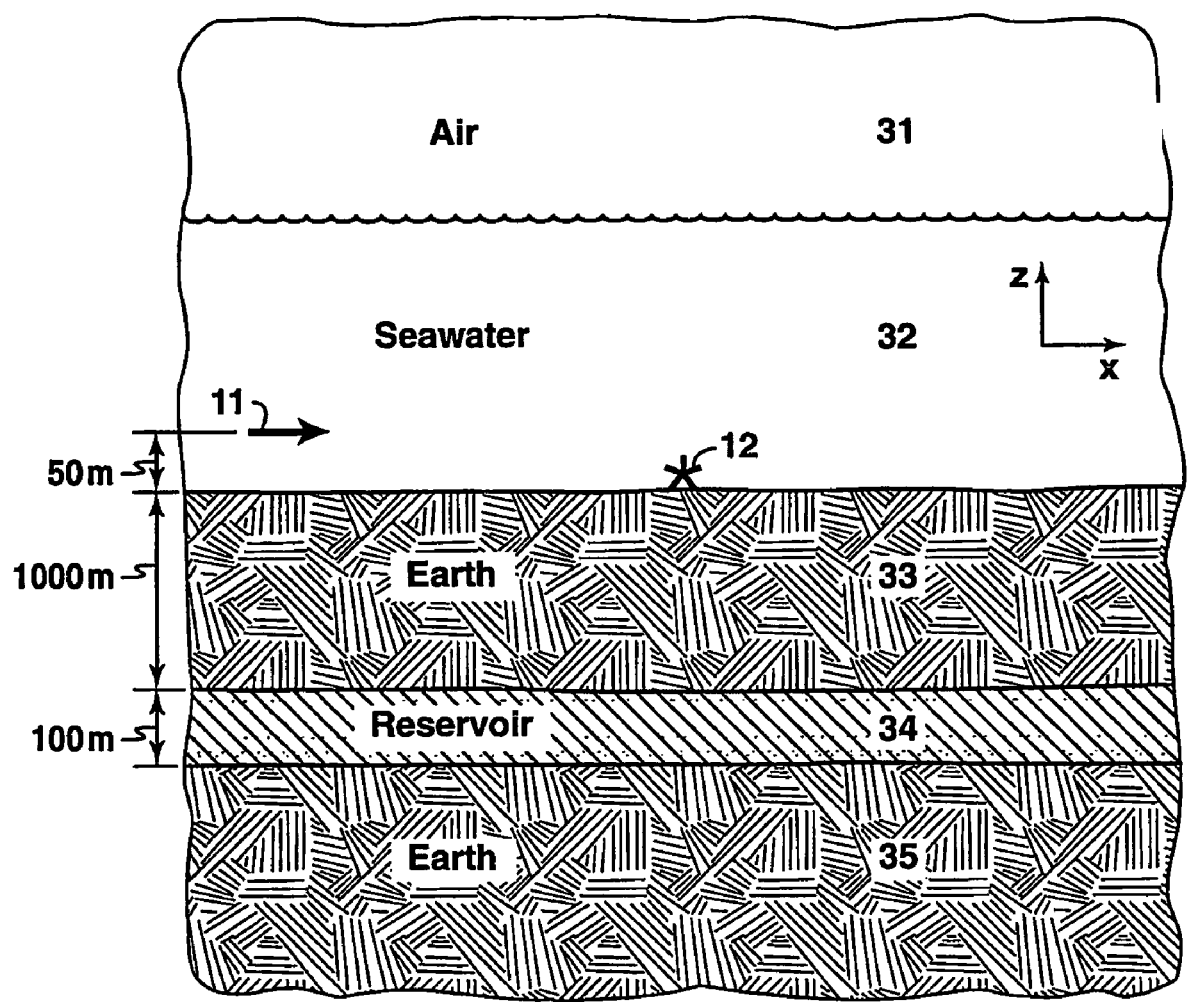
FIG. 3 illustrates a one-dimensional layered model of the earth at an ocean location, also showing CSEM source and receiver location.
Figure 4A:
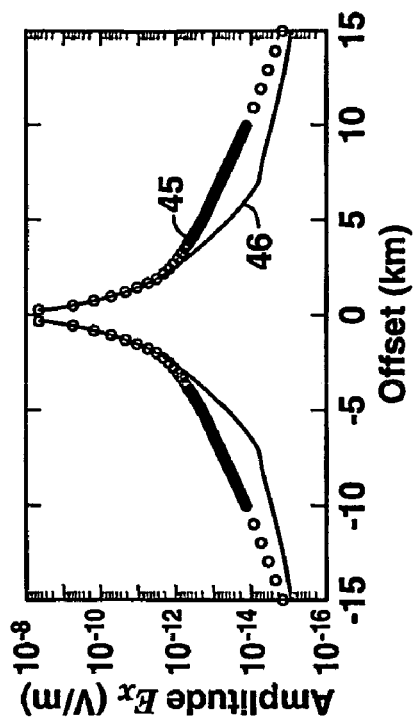
FIGS. 4A-C are graphs of the amplitude of the x-component of the electric field $E_x$ vs. source-receiver separation for different water depths, calculated from the model of FIG. 3.
Figure 4B:
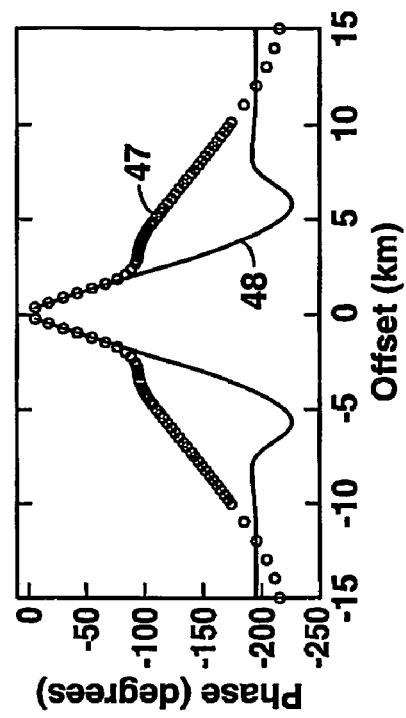
Figure 4D:
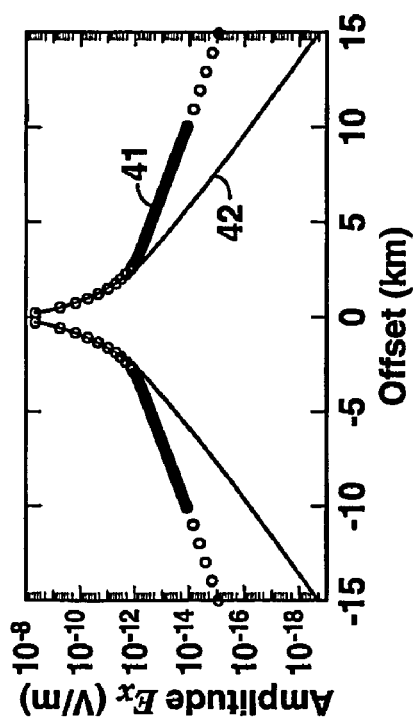
FIGS. 4D-F are graphs of the unwrapped phase of $E_x$ vs. source-receiver separation, calculated from the model for the same three water depths.
Figure 4E:
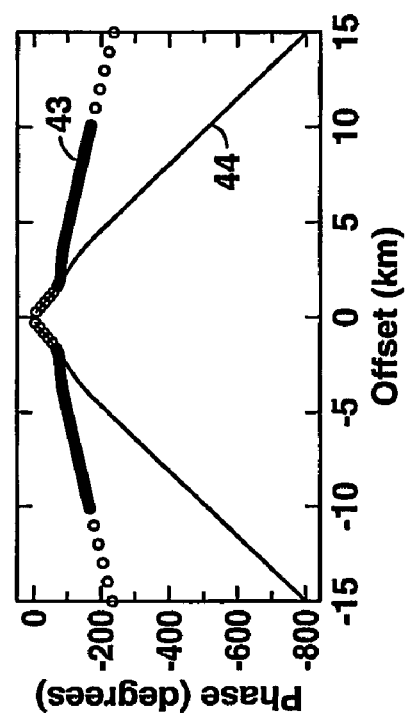
Figure 4C:
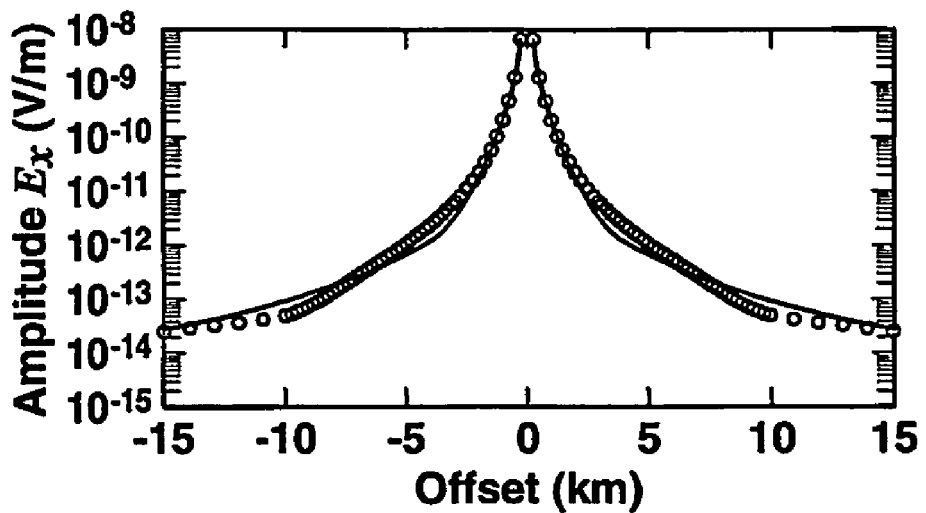
Figure 4F:
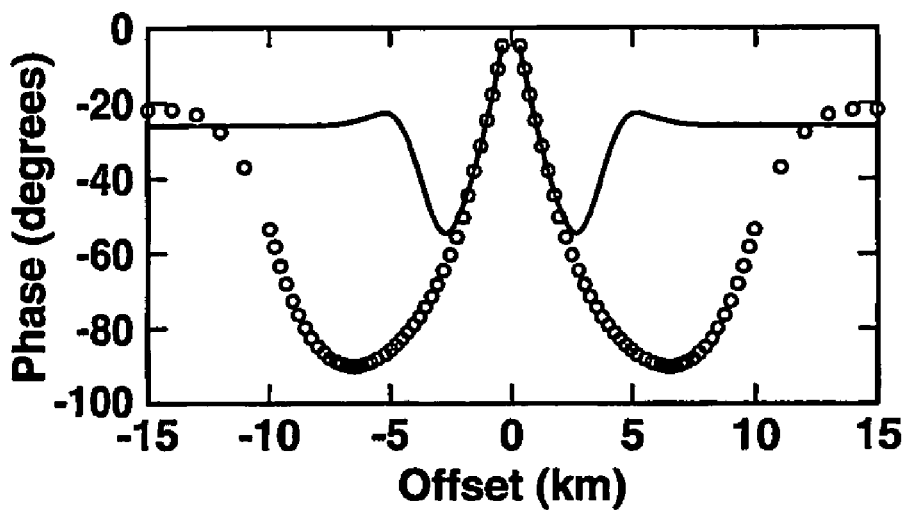
Figure 6B:
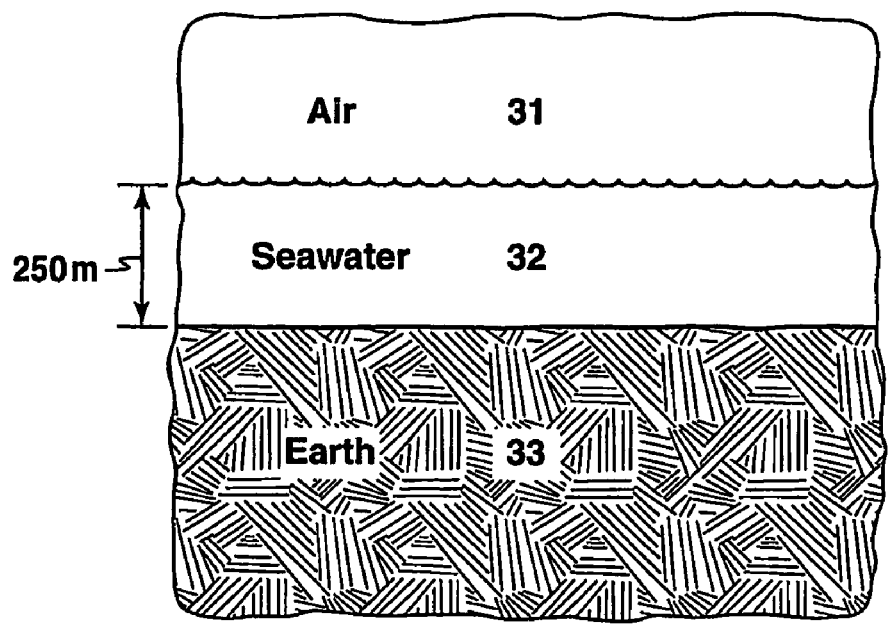
Figure 6C:
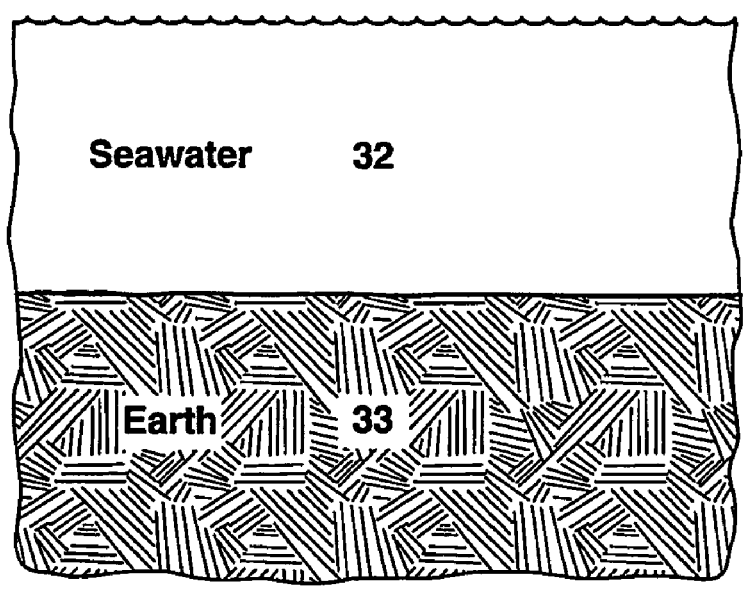
Figure 7A:
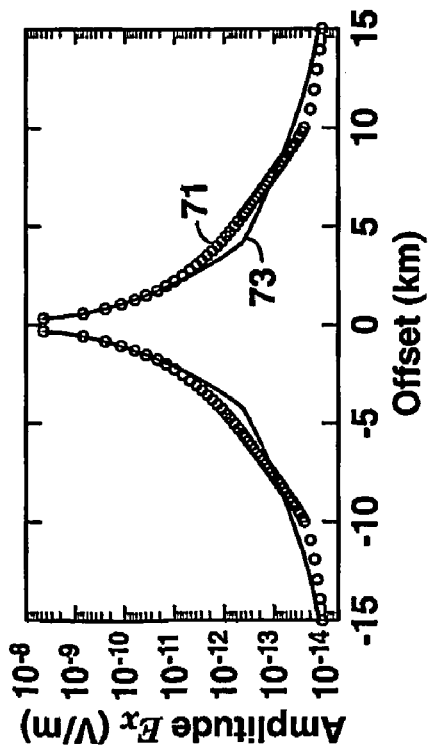
FIGS. 7A-D show modeled frequency domain CSEM results for the 1-D example, comparing the uncorrected amplitude (7A) and phase (7B) results with the corrected amplitude (7C) and phase (7D) results.
Figure 7B:
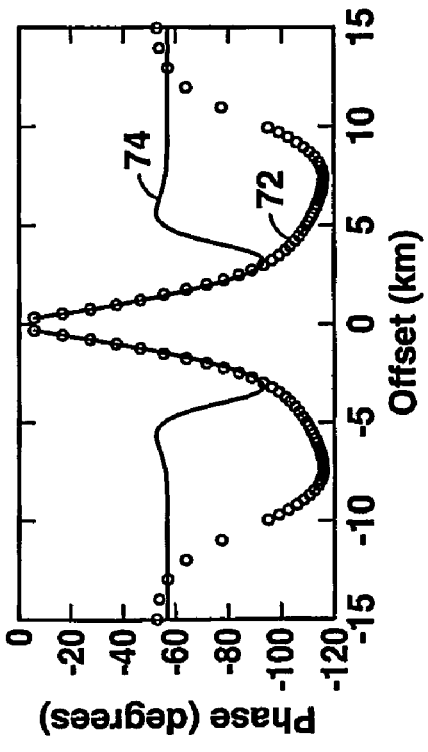
Figure 7C:
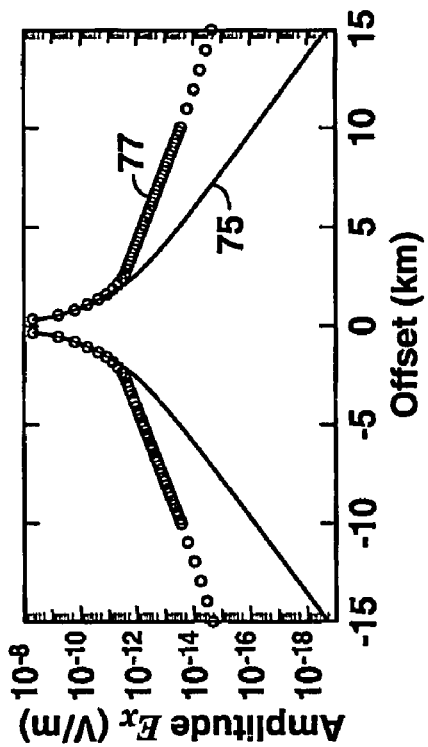
Figure 7D:
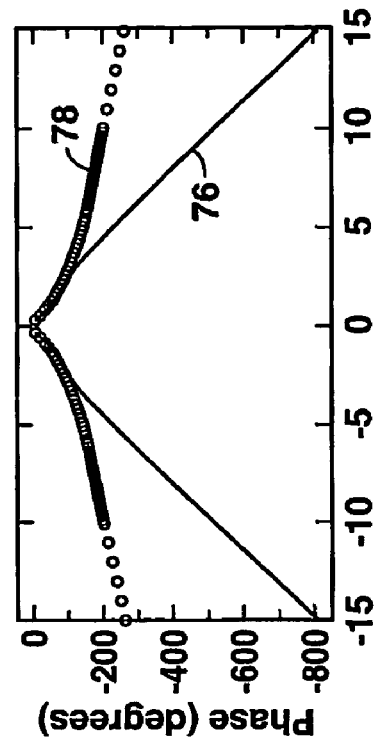

They are the curves of small circles, designated 71 and 72. The model is essentially the same as that of FIG. 3, except that the seawater layer is 250.0 m thick for this example. As shown in FIG. 3 (but not shown in FIG. 6), an x-directed horizontal electric dipole source is towed 50.0 m above the seafloor in the x-direction from −15.0 km to 15.0 km. A receiver located on the seafloor is directly below the midpoint of the source tow line. The corresponding with-air background model (MWA) and no-air background model (MNA) are shown in FIGS. 6B and 6C, respectively. The responses of these two models are computed and graphed. Curves 73 and 74 in FIGS. 7A and 7B are the DWA response generated from the MWA model of FIG. 6B. The DNA response from the MNA model is represented by curves 75 and 76 in FIGS. 7C and 7D. The air wave effect (AWE) is computed by subtracting DNA from DWA. Normalization is implemented by setting receiver and source parameters the same for both the generated field data and the computed responses of the two background models. Then the air wave effect is removed from the field data by subtracting AWE from FDWA, and the corrected data (FDNA) is shown in FIGS. 7C and 7D as curves 77 and 78. It can be noted that FIGS. 7A and 7B, showing the uncorrected field data compared to background, look very much like the shallow water results in FIGS. 4C and 4F, where the air wave dominates and thus there is no separation in amplitude between the data with target and the background data. In contrast, the corrected field data of FIGS. 7C and 7D look very much like the deep water results shown in FIGS. 4A and 4D where there is good separation between the data with target and the background data because the air wave effect is negligible for deep water. The air wave effect is also negligible in FIGS. 7C and 7D because it has been removed by the present inventive method.

Figure 8A:
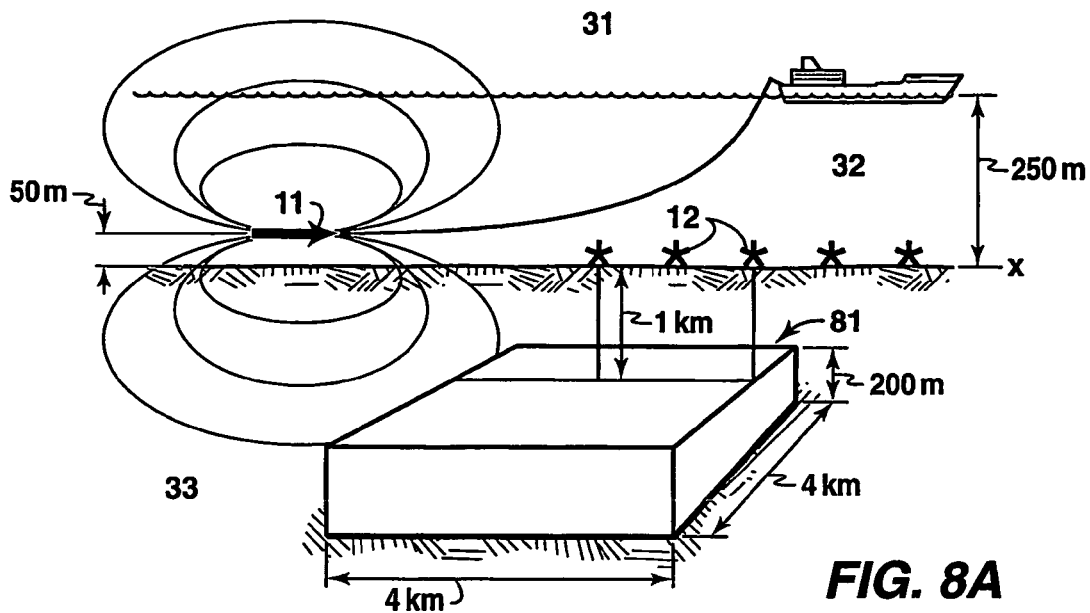
FIGS. 8A-C illustrate models used in a three-dimensional example application, with 8A showing the full model, 8B showing the target (reservoir) layer removed, and 8C showing no target layer or air layer.
Figure 8B:
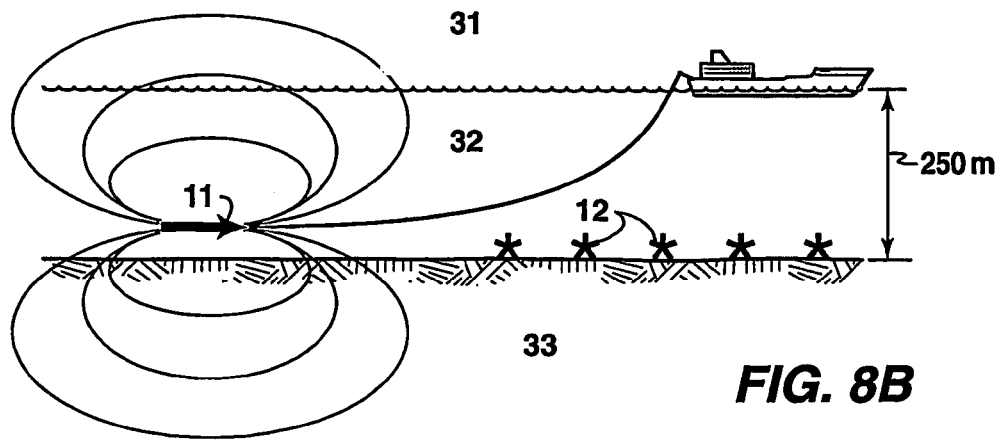
Figure 8C:
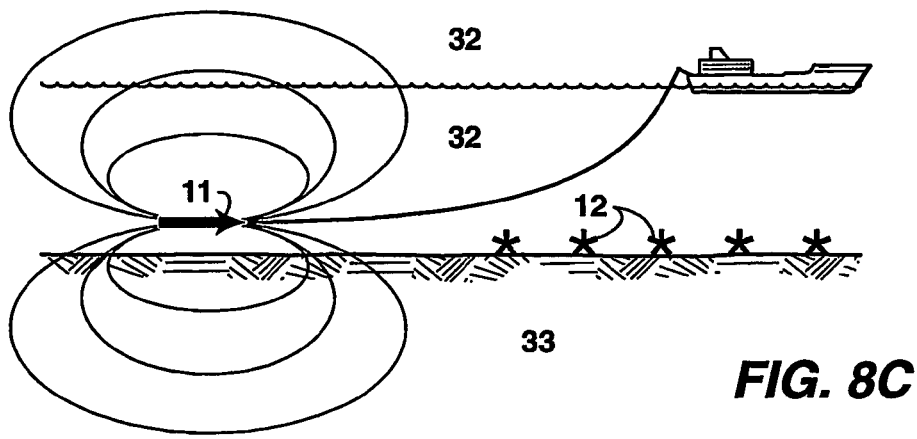
Figure 9A:
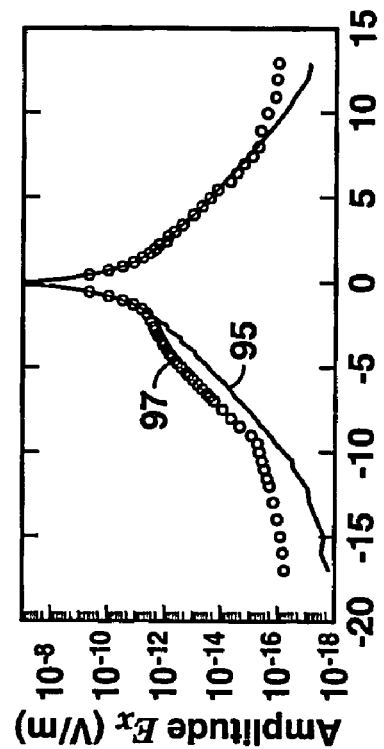
FIGS. 9A-D show modeled CSEM results for the 3-D example, comparing the uncorrected amplitude (9A) and phase (9B) results with the corrected amplitude (9C) and phase (9D) results.
Figure 9C:
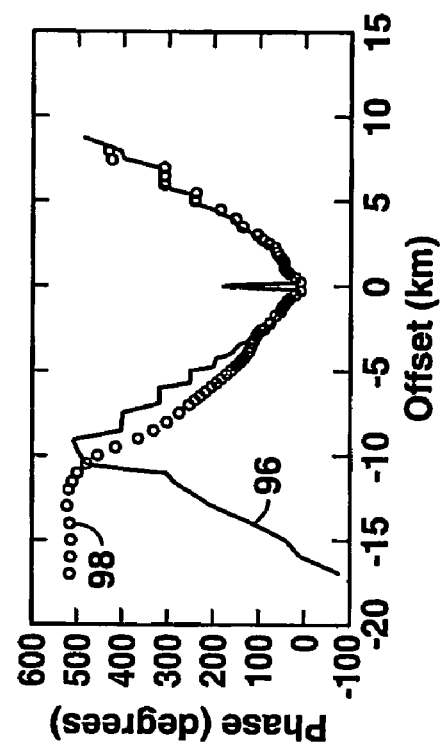
Figure 9B:
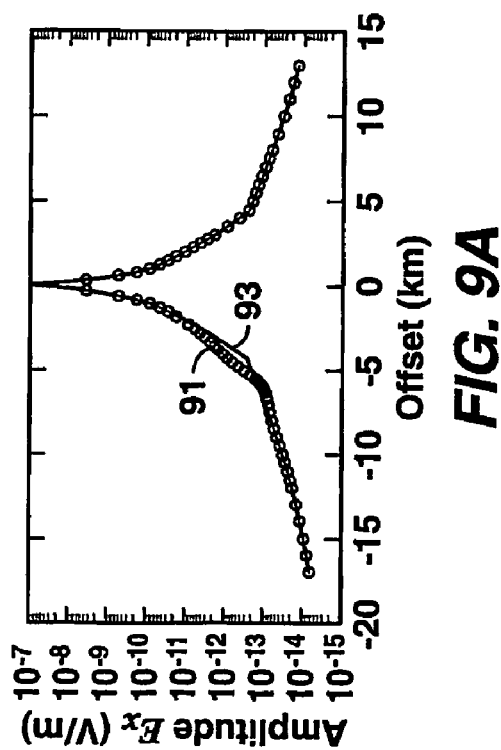
Figure 9D:
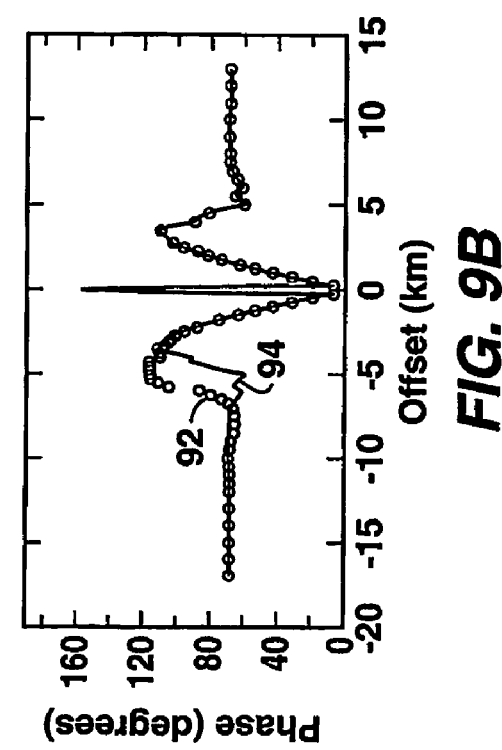
Figure 10A:
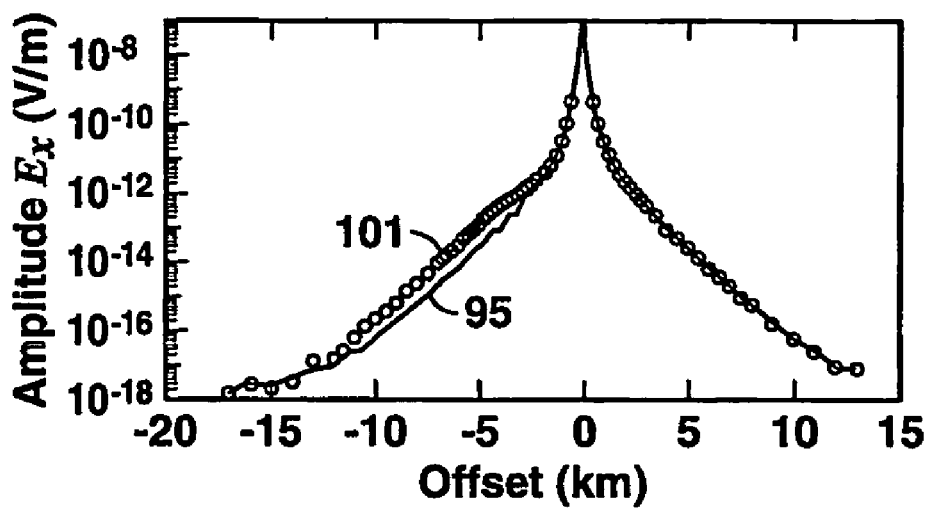
FIGS. 10A and 10B show the theoretical results for $E_x$ amplitude (10A) and its unwrapped phase (10B) for the 3-D example.
Figure 10B:
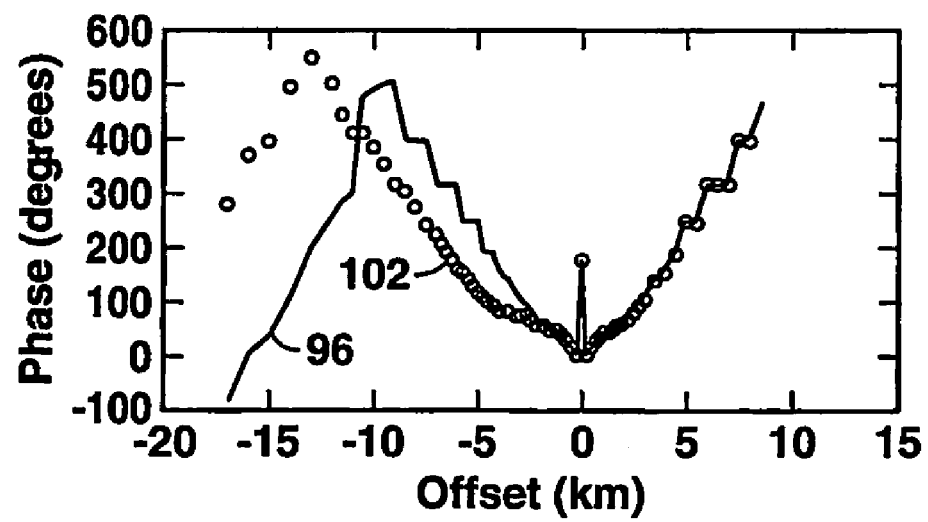

FIG. 8A shows a 3-D model which was used to generate synthetic field data (FDWA) with the air wave effect. Those data are plotted (the small circle data points) as curves 91 and 92 on FIGS. 9A and 9B. The model consists of air 31, seawater 32, a resistive square slab of finite dimensions 81, and a uniform earth 33. The top of the model is a non-conductive air half-space, while the bottom is a uniform earth with the conductivity of 1.0 Siemens/m. The resistive slab is 4.0 km×4.0 km×200 m with conductivity of 0.01 Siemens/m and is buried 1.0 km below the seafloor. The seawater layer is 250.0 m thick and its conductivity increases in steps from 3.0 Siemens/m at the bottom to 5.0 Siemens/m at the seasurface. An x-directed horizontal electric dipole source 11 is towed 50 m above the seafloor in the x-direction from −15 km to 15 km. The closed curved lines emanating from the source represent the electromagnetic field generated by the source. Five receivers 12 are deployed on the seafloor. One receiver is located directly above the center of the slab and below the mid point of the source tow line. The other four receivers are spaced at 1.0 km intervals along the tow line (positive x) direction, however only data from the one receiver located directly above the edge of the resistive slab is used in this example. The corresponding with-air background model (MWA) and no-air background model (MNA) are shown in FIGS. 8B and 8C, respectively. The responses of these two models (called DWA and DNA, respectively) are computed. DWA is shown in FIGS. 9A and 9B as curves 93 and 94. DNA is plotted in FIGS. 9C and 9D as curves 95 and 96. The air wave effect (AWE) is computed by subtracting DNA from DWA. The air wave effect is then removed from the field data by subtracting AWE from FDWA. The corrected amplitude and phase data (FDNA) are shown as curve 97 in FIG. 9C and curve 98 in FIG. 9D. FIGS. 9A and 9B show that the air wave effect makes it very hard to predict whether the target exists, even though the target is very large. However, FIGS. 9C and 9D show the corrected data clearly separate the target signal from the background. FIGS. 10A and 10B show theoretical no air wave effect data 101 and 102. The theoretical result is calculated from a model shown in FIG. 8A with the top air layer replaced by seawater in the same way that the electric fields are calculated in steps 112 and 114 of FIG. 11. The solid curves 95 and 96 are the "DNA" data, i.e., calculated from the model of FIG. 8C. The comparison of curve 101 to curve 95 in FIG. 10A and the comparison of curve 102 to curve 96 in FIG. 10B indicate that the correction is very effective. This example shows the effectiveness of the present invention in removing the air wave effect for a 3-D model.

The foregoing description is directed to particular embodiments of the present invention for the purpose of illustrating it. It will be apparent, however, to one skilled in the art, that many modifications and variations to the embodiments described herein are possible. For example, the invention is discussed using an horizontal electric dipole as the example electromagnetic source; however, the invention is equally applicable to any CSEM source, for example a vertical magnetic dipole. Also, the invention works in fresh water as well as salt water, and the word sea should be interpreted accordingly. All such modifications and variations are intended to be within the scope of the present invention, as defined in the appended claims.

We claim:

1. A method for removing the air wave effect from frequency domain controlled source electromagnetic survey data collected from a sea-covered region, comprising the steps of:
   (a) constructing a first model of the region having from top to bottom an air layer, a sea-water layer, and a sea bottom layer, said model reflecting known bathymetry and conductivities;
   (b) computing the electromagnetic fields due to the source at all source and receiver locations in the survey, assuming the first model;
   (c) constructing a second model of the region by replacing the air layer in the first model with sea-water, and then computing the electromagnetic fields for the second model at the same source and receiver locations;
   (d) normalizing receiver and source parameters between the computed fields and the survey data;
   (e) computing the air wave effect by subtracting the field produced by the second model from the field produced by the first model at each receiver location for each source location; and
   (f) subtracting the computed air wave effect from the actual survey data at each receiver location for each source location.

2. The method of claim 1, wherein the electromagnetic fields are computed by solving Maxwell's equations.

3. The method of claim 1, wherein the receiver and source parameters are antenna length and source strength.

4. The method of claim 1, wherein the source is one of the following types: a horizontal electric dipole; a horizontal magnetic dipole; a vertical electric dipole; a vertical magnetic dipole; a combination of the preceding types.

5. The method of claim 1, wherein the computing steps make use of position and orientation measurements for source and receivers that are obtained using at least one of the following methods: (a) acoustic methods; (b) global positioning system; (c) magnetic compass; and (d) inertial navigation.

* * * * *